United States Patent
Gammie et al.

(10) Patent No.: US 10,626,221 B2
(45) Date of Patent: Apr. 21, 2020

(54) METHOD OF PREPARING ORGANOSILOXANE

(71) Applicant: Dow Silicones Corporation, Midland, MI (US)

(72) Inventors: Andy Gammie, Florence, KY (US); Stephanie Minges, La Grange, KY (US)

(73) Assignee: Dow Silicones Corporation, Midland, MI (US)

(*) Notice: Subject to any disclaimer, the term of this patent is extended or adjusted under 35 U.S.C. 154(b) by 133 days.

(21) Appl. No.: 15/773,100

(22) PCT Filed: Nov. 1, 2016

(86) PCT No.: PCT/US2016/059823
§ 371 (c)(1),
(2) Date: May 2, 2018

(87) PCT Pub. No.: WO2017/079106
PCT Pub. Date: May 11, 2017

(65) Prior Publication Data
US 2018/0312639 A1    Nov. 1, 2018

Related U.S. Application Data

(60) Provisional application No. 62/250,596, filed on Nov. 4, 2015.

(51) Int. Cl.
*C08G 77/08* (2006.01)
*C08G 77/06* (2006.01)
*C08G 77/16* (2006.01)
*C08G 77/24* (2006.01)

(52) U.S. Cl.
CPC ............. *C08G 77/06* (2013.01); *C08G 77/08* (2013.01); *C08G 77/16* (2013.01); *C08G 77/24* (2013.01)

(58) Field of Classification Search
CPC ................ C08G 77/06; C08G 77/08

USPC ......................................................... 528/12
See application file for complete search history.

(56) References Cited

U.S. PATENT DOCUMENTS

| 4,855,472 | A | * | 8/1989 | Burkhardt | C08G 77/06 556/459 |
| 4,975,510 | A | * | 12/1990 | Wegehaupt | C08G 77/06 528/21 |
| 5,508,369 | A | * | 4/1996 | Yamazaki | C07F 7/0838 528/32 |
| 5,565,540 | A | * | 10/1996 | Okawa | C07F 7/0874 528/14 |
| 5,565,590 | A | | 10/1996 | Zima et al. | |
| 6,415,093 | B1 | | 7/2002 | Nakamura et al. | |
| 7,683,198 | B2 | | 3/2010 | Schaefer et al. | |

FOREIGN PATENT DOCUMENTS

| EP | 0258640 A1 | 3/1988 |
| EP | 2141188 A1 | 1/2010 |

OTHER PUBLICATIONS

PCT/US2016/059823 International Search Report dated Dec. 14, 2016, 4 pages.

* cited by examiner

*Primary Examiner* — Margaret G Moore
(74) *Attorney, Agent, or Firm* — Warner Norcross + Judd LLP

(57) ABSTRACT

A method of preparing an organosiloxane comprises cohydrolyzing a mixture comprising a first silane compound having the general formula $R_2SiX_2$ and a second silane compound having the general formula $R_3SiR^1$ in the presence of an aqueous acid, wherein each R is independently selected from H and a hydrocarbyl group, each X is an independently selected halogen atom, and $R^1$ is X or $OSiR_3$. The organosiloxane is prepared in a reaction product. Optionally, the method comprises isolating the organosiloxane from the reaction product. The organosiloxane has the general formula $R_3SiO(R_2SiO)_nH$, wherein n is an integer from 1 to 200.

20 Claims, No Drawings

METHOD OF PREPARING ORGANOSILOXANE

CROSS-REFERENCE TO RELATED APPLICATIONS

This application is the National Stage of International Application No. PCT/US2016/059823 filed on 1 Nov. 2016, which claims priority to and all advantages of U.S. Provisional Patent Application No. 62/250,596 filed on 4 Nov. 2015, the contents of which is hereby incorporated by reference.

FIELD OF THE INVENTION

The present invention generally relates to a method of preparing an organosiloxane and, more specifically, to a method of preparing an organosiloxane via cohydrolysis of a first and a second silane compound.

DESCRIPTION OF THE RELATED ART

Organosiloxanes and methods of their preparation are known in the art. For example, organopolysiloxane polymers, which are one type of organosiloxane, are commonly formed via condensation polymerization of hydroxyl-terminated organosiloxanes, which may be oligomeric or polymeric in nature. Silicon-bonded hydroxyl groups of adjacent molecules condense to form siloxane bonds with water as a by-product.

It is generally desirable to control molecular weight and viscosity of organopolysiloxane polymers, as different molecular weights give rise to different physical properties and end use applications. An endblocker is commonly utilized to cap the organopolysiloxane polymer as it is being formed, which terminates the polymerization reaction. Endblockers often introduce undesirable byproducts, such as ammonia, into a reaction vessel as the endblockers hydrolyze or otherwise react to cap the organopolysiloxane polymer.

SUMMARY OF THE INVENTION

The present invention provides a method of preparing an organosiloxane. The method comprises cohydrolyzing a mixture comprising a first silane compound having the general formula $R_2SiX_2$ and a second silane compound having the general formula $R_3SiR^1$ in the presence of an aqueous acid, wherein each R is independently selected from H and a hydrocarbyl group, each X is an independently selected halogen atom, and $R^1$ is X or $OSiR_3$. The organosiloxane is prepared in a reaction product. Optionally, the method comprises isolating the organosiloxane from the reaction product. The organosiloxane has the general formula $R_3SiO(R_2SiO)_nH$, wherein n is an integer from 1 to 200.

DETAILED DESCRIPTION OF THE INVENTION

The term "substantial" or "substantially" as used herein to describe any substantially linear organopolysiloxane or organosiloxane means that in relation to the notation of MDTQ of an organopolysiloxane or organosiloxane, there is less than 5 mole % or less than 2 mole % of the units T and/or Q. The M, D, T, Q designate one (Mono), two (Di), three (Tri), or four (Quad) oxygen atoms covalently bonded to a silicon atom that is linked into the rest of the molecular structure. The M, D, T and Q units are typically represented as $R_uSiO_{(4-u)}/2$, where u is 3, 2, 1, and 0 for M, D, T, and Q, respectively, and R is a substituted or unsubstituted hydrocarbon group.

The term "about" as used herein serves to reasonably encompass or describe minor variations in numerical values measured by instrumental analysis or as a result of sample handling. Such minor variations may be in the order of plus or minus 0% to 10% or plus or minus 0% to 5% of the numerical values.

The term "branched" as used herein describes a polymer, e.g. an organopolysiloxane, with more than two end groups.

The term "comprising" is used herein in its broadest sense to mean and to encompass the notions of "include" and "consist of."

The term "ambient temperature" or "room temperature" refers to a temperature between about 20° C. and about 30° C. Usually, room temperature ranges from about 20° C. to about 25° C.

The use of "for example" or "such as" to list illustrative examples does not limit to only the listed examples. Thus, "for example" or "such as" means "for example, but not limited to" or "such as, but not limited to" and encompasses other similar or equivalent examples.

All viscosity measurements referred to herein were measured at 25° C. unless otherwise indicated.

An organopolysiloxane is intended to mean a polymer comprising multiple organosiloxane or polyorganosiloxane groups per molecule. Organopolysiloxane is intended to include polymers substantially containing only organosiloxane or polyorganosiloxane groups in the polymer chain, and polymers where the backbone contains both organosiloxane and/or polyorganosiloxane groups and organic polymer groups in the polymer chain. Such polymers may be homopolymers or copolymers, including, for example, block copolymers and random copolymers.

"Hydrocarbyl" means a monovalent hydrocarbon group which may be substituted or unsubstituted. Specific examples of hydrocarbyl groups include alkyl groups, alkenyl groups, alkynyl groups, aryl groups, aralkyl groups, etc.

"Alkyl" means an acyclic, branched or unbranched, saturated monovalent hydrocarbon group. Alkyl is exemplified by, but not limited to, Me, Et, Pr (e.g., iso-propyl and/or n-propyl), Bu (e.g., isobutyl, n-butyl, tert-butyl, and/or sec-butyl), pentyl (e.g., isopentyl, neopentyl, and/or tert-pentyl), hexyl, heptyl, octyl, nonyl, decyl, undecyl, and dodecyl as well as branched saturated monovalent hydrocarbon groups of 6 to 12 carbon atoms. Alkyl groups may have 1 to 30 carbon atoms, alternatively 1 to 24 carbon atoms, alternatively 1 to 20 carbon atoms, alternatively 1 to 12 carbon atoms, alternatively 1 to 10 carbon atoms, and alternatively 1 to 6 carbon atoms.

"Alkylene" means an acyclic, branched or unbranched, saturated divalent hydrocarbon group.

"Alkenyl" means an acyclic, branched or unbranched, monovalent hydrocarbon group having one or more carbon-carbon double bonds. Alkenyl is exemplified by, but not limited to, vinyl, allyl, propenyl, and hexenyl. Alkenyl groups may have 2 to 30 carbon atoms, alternatively 2 to 24 carbon atoms, alternatively 2 to 20 carbon atoms, alternatively 2 to 12 carbon atoms, alternatively 2 to 10 carbon atoms, and alternatively 2 to 6 carbon atoms.

"Alkenylene" means an acyclic, branched or unbranched, divalent hydrocarbon group having one or more carbon-carbon double bonds.

"Alkynyl" means an acyclic, branched or unbranched, monovalent hydrocarbon group having one or more carbon-carbon triple bonds. Alkynyl is exemplified by, but not limited to, ethynyl, propynyl, and butynyl. Alkynyl groups may have 2 to 30 carbon atoms, alternatively 2 to 24 carbon atoms, alternatively 2 to 20 carbon atoms, alternatively 2 to 12 carbon atoms, alternatively 2 to 10 carbon atoms, and alternatively 2 to 6 carbon atoms.

"Alkynylene" means an acyclic, branched or unbranched, divalent hydrocarbon group having one or more carbon-carbon triple bonds.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms.

"Arylene" means a cyclic, fully unsaturated, divalent hydrocarbon group.

"Aralkyl" means an alkyl group having a pendant and/or terminal aryl group or an aryl group having a pendant alkyl group. Exemplary aralkyl groups include tolyl, xylyl, mesityl, benzyl, phenylethyl, phenyl propyl, and phenyl butyl.

The term "substituted" as used in relation to another group, e.g. a hydrocarbyl group, means, unless indicated otherwise, one or more hydrogen atoms in the hydrocarbyl group has been replaced with another substituent or atom. Examples of such substituents or atoms include, for example, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

The present invention provides a method of preparing an organosiloxane. The inventive method prepares organosiloxanes having excellent properties and suitable for use in a variety of end uses and applications, including as a component in curable silicone compositions, e.g. condensation-curable silicone compositions. Further, the inventive method allows for isolation of desired species of organosiloxane, as described below. As such, the inventive method is particularly suitable for preparing organosiloxanes having selected properties, including molecular weight, which can be utilized as terminating agents while providing additional control during polymerization.

The method comprises cohydrolyzing a mixture in the presence of an aqueous acid. The mixture comprises a first silane compound and second silane compound.

The first silane compound has the general formula $R_2SiX_2$, where each R is independently selected from H and a hydrocarbyl group and each X is an independently selected halogen atom. The hydrocarbyl groups represented by R may independently be substituted or unsubstituted.

Each R is independently selected and may be for example, H, an alkyl group, an alkenyl group, an aryl group, an alkynyl group, an aralkyl group, etc. In certain embodiments, each R is independently selected from a $C_1$-$C_{10}$, alternatively a $C_1$-$C_8$, alternatively a $C_1$-$C_6$, alternatively a $C_1$-$C_4$, hydrocarbyl group. In specific embodiments, each R is selected from methyl, ethyl, propyl, and butyl groups, alternatively each R is methyl.

Each X may be independently selected from F, Cl, Br, I, and At, alternatively from F, Cl, and Br, alternatively from F and Cl. In various embodiments, each X is Cl. In various embodiments, X may be an independently selected silicon-bonded hydrolysable group other than a halogen atom. For example, in certain embodiments, X is independently selected from H, a halide group, an alkoxy group, an alkylamino group, a carboxy group, an alkyliminoxy group, an alkenyloxy group, an N-alkylamido group, and combinations thereof.

When each R is an independently selected hydrocarbyl group, the first silane compound includes two independently selected silicon-bonded hydrocarbyl groups represented by R and two independently selected silicon-bonded halogen atoms represented by X and may be referred to as a diorganodihalosilane. In the inventive method, the silicon-bonded halogen atoms (Si—X) of the first silane compound hydrolyze to give silanol groups (Si—OH), which may subsequently condense with one another to provide siloxane bonds (Si—O) with water as a byproduct. When both silicon-bonded halogen atoms hydrolyze and condense, the first silane compound is converted and incorporated into the organosiloxane as a D unit, i.e., as a diorganosiloxy unit.

Depending on a selection of R and X, the first silane compound may be exemplified by dimethyldichlorosilane, dimethyldibromosilane, methylethyldichlorosilane, methylvinyldichlorosilane, methylphenyldichlorosilane, diphenyldichlorosilane, phenylvinyldichlorosilane, dimethylfluorosilane, methylethylfluorosilane, etc. Combinations of different species within the general formula above may be utilized together as the first silane compound.

The mixture further comprises a second silane compound. The second silane compound is distinguished from the first silane compound. The second silane compound has the general formula $R_3SiR^1$, wherein R is independently selected and defined above and $R^1$ is X or $OSiR_3$.

As with the first silane compound, each R of the second silane compound is independently selected and may be for example, H, an alkyl group, an alkenyl group, an aryl group, an alkynyl group, an aralkyl group, etc. In certain embodiments, each R of the second silane compound is independently selected from a $C_1$-$C_{10}$, alternatively a $C_1$-$C_8$, alternatively a $C_1$-$C_6$, alternatively a $C_1$-$C_4$, hydrocarbyl group. In specific embodiments, each R of the second silane compound is selected from methyl, ethyl, propyl, and butyl groups, alternatively each R is methyl.

Each X of the second silane compound may be independently selected from F, Cl, Br, I, and At, alternatively from F, Cl, and Br, alternatively from F and Cl. In various embodiments, each X of the second silane compound is Cl. In various embodiments, X may be an independently selected silicon-bonded hydrolysable group other than a halogen atom. For example, in certain embodiments, X is independently selected from H, a halide group, an alkoxy group, an alkylamino group, a carboxy group, an alkyliminoxy group, an alkenyloxy group, an N-alkylamido group, and combinations thereof.

In a first embodiment, $R^1$ is X. In this embodiment, the second silane compound has the general formula $R_3SiX$, where R and X are defined above. When each R is an independently selected hydrocarbyl group in this first embodiment, the second silane compound includes three independently selected silicon-bonded hydrocarbyl groups represented by R and one silicon-bonded halogen atom represented by X. The second silane compound in this first embodiment may be referred to as a triorganohalosilane.

Depending on a selection of R and X, the second silane compound in this first embodiment may be exemplified by trimethylchlorosilane, dimethylethylchlorosilane, trimethylfluorosilane, methyldipropylchlorosilane, dimethylphenylchlorosilane, etc. Combinations of different triorganohalosilanes may be utilized together as the second silane compound in this first embodiment.

In certain embodiments of the inventive method, the silicon-bonded halogen atom (Si—X) of the second silane compound hydrolyzes to give a silanol group (Si—OH), which may subsequently condense with one another silanol group to provide siloxane a bond (Si—O) with water as a byproduct. When the silicon-bonded halogen atom hydrolyzes and condenses, the second silane compound is converted and incorporated into the organosiloxane as a terminal group, i.e., an M unit.

In a second embodiment, $R^1$ is X or $OSiR_3$ such that the second silane compound has the general formula $R_3SiOSiR_3$, where R is independently selected and defined above. In this second embodiment, when each R is an independently selected hydrocarbyl group, the second silane compound includes six independently selected silicon-bonded hydrocarbyl groups represented by R. The second silane compound in this embodiment may be referred to as a disiloxane compound, e.g. a hexahydrocarbyldisiloxane compound. When each R is an independently selected alkyl group, the second silane compound in this second embodiment may be referred to as a hexaalkyldisiloxane. When each R is methyl, the second silane compound in this second embodiment may be exemplified by hexamethyldisiloxane. Combinations of different hexahydrocarbyldisiloxane compounds may be utilized together as the second silane compound in this second embodiment.

Combinations of different hexahydrocarbyldisiloxane compounds may be utilized together as the second silane compound in this second embodiment.

In certain embodiments of the inventive method involving the second embodiment of the second silane compound, a portion of the second silane compound is converted and incorporated into the organosiloxane as a terminal group, i.e., an M unit.

Although two different embodiments relating to the second silane compound are described above, in certain embodiments, the second silane compound may comprise a mixture of those associated with the two different embodiments. Said differently, the second silane compound may comprise a combination of triorganohalosilanes and hexahydrocarbyldisiloxane compounds. In certain embodiments, the second silane compound is the triorganohalosilane, or a mixture of triorganohalosilanes, to the exclusion of any hexahydrocarbyldisiloxane compounds. In other embodiments, the second silane compound is the hexahydrocarbyldisiloxane compound, or mixture of hexahydrocarbyldisiloxane compounds, to the exclusion of any triorganohalosilanes.

If certain embodiments, the mixture comprises a third silane compound. The third silane compound has the general formula $RSiX_3$, wherein R is defined above and X is independently selected and defined above. The third silane compound includes one silicon-bonded hydrocarbyl group represented by R and three independently selected silicon-bonded halogen atoms represented by X. The third silane compound may be referred to as an organotrihalosilane. In various embodiments, X may be an independently selected silicon-bonded hydrolysable group other than a halogen atom. For example, in certain embodiments, X is independently selected from H, a halide group, an alkoxy group, an alkylamino group, a carboxy group, an alkyliminoxy group, an alkenyloxy group, an N-alkylamido group, and combinations thereof.

Depending on a selection of R and X, the third silane compound may be exemplified by methyltrichlorosilane, ethyltrichlorosilane, phenyltrichlorosilane, vinyltrichlorosilane, methyldichlorofluorosilane, etc. Combinations of different organotrihalosilanes may be utilized together as the third silane compound.

In certain embodiments of the inventive method in which the mixture comprises the third silane compound, the silicon-bonded halogen atoms (Si—X) of the third silane compound hydrolyze to give silanol groups (Si—OH), which may subsequently condense with one another silanol group to provide siloxane bonds (Si—O) with water as a byproduct. When the silicon-bonded halogen atoms hydrolyze and condense, the third silane compound introduces branching to the organosiloxane. In particular, the third silane compound is converted and incorporated into the organosiloxane as a T unit.

Generally, the organosiloxane prepared via the inventive method is substantially linear. In these embodiments, the mixture is substantially free from the third silane compound. "Substantially free" in this context means that the mixture comprises the third silane compound in an amount of less than 10, alternatively less than 5, alternatively less than 1, alternatively 0, mol percent based on all silane compounds (including the first, second, and third silane compounds) present in the mixture. For example, in certain embodiments, the mixture consists essentially of, alternatively consists of, the first and second silane compounds.

As introduced above, the method comprises cohydrolyzing the silane compounds of the mixture in the presence of an aqueous acid. The aqueous acid generally comprises an inorganic acid and water. If desired, the aqueous acid may further comprise a solvent other than water, e.g. an organic solvent or vehicle. If present, the organic solvent or vehicle is typically water-soluble. In certain embodiments, the aqueous acid is free from such organic solvents or vehicles. As described below, the inorganic acid of the aqueous acid may be generated in situ. For example, water may be combined with the mixture such that the silane compounds of the mixture at least partially hydrolyze in the presence of the water, and when each X is Cl hydrochloric acid is formed in situ to give the aqueous acid. Alternatively, the aqueous acid including the inorganic acid may be combined discretely with the mixture.

The inorganic acid of the aqueous acid may be any inorganic acid capable of hydrolyzing the first and silane (and optionally third) silane compounds of the mixture. Specific examples of particularly suitable inorganic acids include hydrochloric acid, sulfuric acid, and nitric acid. Combinations of different inorganic acids may be utilized together. In certain embodiments, the inorganic acid comprises, alternatively consists of, hydrochloric acid. In certain embodiments, the aqueous acid consists essentially of, alternatively consists of, the inorganic acid and water.

A concentration of the aqueous acid may vary and may be selected based on desired parameters associated with the inventive method. "Concentration" of the aqueous acid refers to a weight of the inorganic acid present in the aqueous acid relative to the total weight of the aqueous acid (i.e., the total weight of the inorganic acid and water in the aqueous acid). As such, the concentration of the aqueous acid is expressed in terms of wt % (wt/wt), which is distinguished from molarity and molality.

The concentration of the aqueous acid may be adjusted or selected based on other parameters associated with the inventive method, including desired species of organosiloxane. For example, in certain embodiments, it may be desirable to utilize higher concentrations of the aqueous acid. In these embodiments, the concentration of the aqueous acid may range from greater than 20 to 50, alternatively from greater than 20 to 40, alternatively from greater than 20 to 30, wt %. In certain embodiments, the aqueous acid is saturated.

When the concentration of the aqueous acid is within the range described above, and depending on a selection of the inorganic acid, inorganic acid gas may be liberated during the inventive method. For example, when the inorganic acid is hydrochloric acid, anhydrous hydrochloric acid gas may be liberated during the inventive method, which advantageously may be captured and recycled.

In other embodiments, the concentration of the aqueous acid is less than that in the range identified above. For example, in certain embodiments, it may be desirable to utilize lesser concentrations of the aqueous acid. In these embodiments, the concentration of the aqueous acid may range from greater than 0 to less than 20, alternatively from greater than 0 to 15, alternatively 1 to 10, wt %.

The mixture and the aqueous acid are generally fed to a vessel, e.g. a reactor, where the first and second silane compounds (and optionally the third silane compound) are cohydrolyzed in the presence of the aqueous acid. The silane compounds of the mixture and the aqueous acid may be fed together or separately to the vessel, and may be disposed in the vessel in any order of addition. Typically, the mixture is fed to the vessel separately from the aqueous acid so as to prevent premature cohydrolysis of the silane compounds of the mixture before reaching the vessel. Individual components may be fed to the vessel sequentially over time or at once. Alternatively, the aqueous acid may be formed in situ in the vessel such that aqueous acid need not be fed to the vessel. For example, water may be provided to the vessel in lieu of the aqueous acid, which partially hydrolyzes the silane compounds of the mixture. Hydrolyzing the silane compounds of the mixture with water results in the formation of the aqueous acid in situ, with the species of the aqueous acid corresponding to the particular silicon-bonded halogen atoms of the silane compounds of the mixture (e.g. when X is Cl, the aqueous acid comprises hydrochloric acid). One of skill in the art understands how to achieve a desired concentration of the aqueous acid when formed in situ based on relative amounts of water and the mixture and vessel parameters.

The relative amounts of the silane compounds in the mixture may vary based on a desired structure or formula associated with the organosiloxane. For example, increasing the amount of the first silane compound relative to the amount of the second silane compound utilized may increase a viscosity or degree of polymerization of the organosiloxane. The molar ratio of the first silane compound to the second silane compound in the mixture is generally >1:1, alternatively ≥100:1, alternatively ≥200:1. For example, in specific embodiments, the molar ratio of the first silane compound to the second silane compound in the mixture is from >1:1 to 4:1, alternatively from >1:1 to 3.5:1, alternatively from >1:1 to 3:1; alternatively from >1:1 to 2.5:1; alternatively from >1:1 to 2:1. Typically, increasing this molar ratio increases a molecular weight or degree of polymerization of the resulting organosiloxane.

In certain embodiments, the mixture comprises the first silane compound in an amount of from 50 to 95, alternatively from 50 to 80, alternatively from 50 to 65, mole % based on the total amount of first and second silane compounds present in the mixture. In these or other embodiments, the mixture comprises the second silane compound in an amount of from 5 to 50, alternatively from 20 to 50, alternatively from 35 to 50, mole % based on the total amount of first and second silane compounds present in the mixture. In these or other embodiments, the mixture comprises the third silane compound in an amount of from 0 to 10, alternatively from 0 to 5, alternatively from 0 to 1, alternatively 0, mole % based on the total amount of first and second silane compounds present in the mixture.

The relative amounts of the mixture and the aqueous acid may vary. For example, the relative amount of the aqueous acid may vary based on a concentration thereof, a selection of the inorganic acid present therein, the selection of silane compounds in the mixture, etc. The relative amounts of the mixture and the aqueous acid are recited herein as a phase ratio between the weight of the aqueous acid to the weight of the mixture (i.e., the phase ratio is a wt/wt value). The weight of the aqueous acid includes the weight of the water and the acid itself (e.g. the HCl and the water, which together constitute the aqueous acid). The vessel is typically free from components or reagents other than the aqueous acid and the mixture, and any byproducts or reaction intermediaries prepared via the inventive method. The phase ratio is generally unitless and reflects the relative amount of the mixture and aqueous acid utilized to the exclusion of any byproducts or reaction intermediaries which may form during the inventive method. The phase ratio is typically at least 1:1, alternatively at least 2:1, alternatively at least 3:1, alternatively at least 4:1, alternatively at least 10:1, alternatively at least 20:1, alternatively at least 50:1. For example, in certain embodiments, the phase ratio is from 1:1 to 6:1, alternatively from 1.5:1 to 5:1, alternatively from 2:1 to 4:1. In specific embodiments, the phase ratio is from 3.5:1 to 5.5:1.

Physical properties within the vessel may be modified or controlled as desired. For example, the vessel may optionally be heated, cooled, pressurized, etc. The vessel may be closed or open to atmospheric conditions. In certain embodiments, the inventive method is carried out a temperature of from a melting point temperature to a boiling point temperature of the aqueous acid, alternatively from greater than 0 to a boiling point temperature of the aqueous acid, alternatively from 5 to 100, alternatively from 30 to 70, ° C.

The period of time during which cohydrolysis in the vessel is carried out may also vary. In certain embodiments, it is desirable to minimize the period of time. The period of time may be from greater than 0 to 24, alternatively from greater than 0 to 18, alternatively from 0 to 12, alternatively from 0 to 10, alternatively from 0 to 8, alternatively from 0 to 6, alternatively from 0 to 4, alternatively from 0 to 2, alternatively from 0 to 1, hours. Because it is often desirable to minimize the period of time, cohydrolysis (and the inventive method) is typically carried out for less than one hour such that this period of time is measured in minutes and/or seconds rather than in hours. For example, in specific embodiments, the period of time may be from greater than 0 to 60, alternatively from greater than 0 to 50, alternatively from greater than 0 to 40, alternatively from greater than 0 to 30, alternatively from greater than 0 to 20, alternatively from greater than 0 to 10, alternatively from greater than 0 to 9, alternatively from greater than 0 to 8, alternatively from greater than 0 to 7, alternatively from greater than 0 to 6, alternatively from greater than 0 to 5, alternatively from greater than 0 to 4, alternatively from greater than 0 to 3, alternatively from greater than 0 to 2, alternatively from greater than 0 to 1, minutes. Not only do lesser periods of time lend themselves to greater output and lesser cost (associated with, for example, utilities), but lesser periods of time also typically result in greater concentrations of the organosiloxane being formed via the inventive method. In fact, surprisingly, the yield of the organosiloxane may decrease with time, e.g. there may be more organosiloxane present after merely 5 minutes of the inventive method than after 60 minutes of the inventive method, which is attributable to the organosiloxane undergoing further condensation if left in the vessel, for example to form trimethylsiloxy-terminated polydimethylsiloxane polymers. The inventive method may be a batch, semi-batch, or continuous process, in which case the period of time above relates to the residence time in the vessel. However, the inventive method is typically a batch process.

Co-hydrolysis of the silane compounds of the mixture may also be referred to as co-hydrolysis and co-condensation, as the silane compounds generally hydrolyze in the presence of the aqueous acid and subsequently condense to give the organosiloxane.

In certain embodiments, co-hydrolysis of the silane compounds of the mixture prepares a halogenated organosiloxane. The halogenated organosiloxane generally corresponds to the desired organosiloxane, but includes a silicon-bonded halogen atom rather than a silicon-bonded hydroxyl group. The halogenated organosiloxane typically has the general formula $R_3SiO(R_2SiO)_{n-1}SiR_2X$, where n is an integer from 1 to 200, R is independently selected and defined above, and X is defined above.

Although halogenated organosiloxanes are desirable for certain end use applications, particularly for further reaction, the halogenated organosiloxane has lesser stability and shelf life than the organosiloxane. As such, when co-hydrolysis of the silane compounds of the mixture prepares the halogenated organosiloxane, the method typically further comprises combining the halogenated organosiloxane with water to prepare the organosiloxane from the halogenated organosiloxane.

The halogenated organosiloxane is typically prepared when utilizing higher concentrations of the aqueous acid, e.g. greater than 20 wt. %, as described above. In contrast, the organosiloxane is typically directly prepared when utilizing lesser concentrations of the aqueous acid, e.g. less than 20 wt. %, or from 1 to 10 wt. %.

When the method further comprises combining the halogenated organosiloxane with water to prepare the organosiloxane from the halogenated organosiloxane, water generally hydrolyzes the halogenated organosiloxane to give the organosiloxane. Water may be introduced into the vessel during and/or after formation of the halogenated organosiloxane. Alternatively, the halogenated organosiloxane may be removed from the vessel and subsequently combined with water in the same or a different vessel or apparatus, optionally under mixing or the application of shear, e.g. in a continuously stirred tank reactor (CSTR) or other vessel. The halogenated organopolysiloxane need not be isolated or separated from other components in the vessel prior to combining the halogenated organopolysiloxane with water. Alternatively still, in various embodiments, the halogenated organopolysiloxane is combined with water in the form of steam, e.g. via a countercurrent steam washing column. The step of preparing the organosiloxane from the halogenated organosiloxane may result in at least some condensation of silicon-bonded hydroxyl groups which result from hydrolysis. A catalyst may be utilized when combining the halogenated organosiloxane with water to initiate hydrolysis of the halogenated organosiloxane, although such catalysts are not required.

The inventive method typically prepares the organosiloxane in a reaction product. The reaction product includes byproducts, unreacted silane compounds from the mixture, residual amounts of the aqueous acid, etc. Examples of byproducts include siloxane compounds other than the organosiloxanes. For example, siloxane compounds may include cyclic siloxanes, trialkyl-endblocked diorganopolysiloxanes (e.g. trimethyl-endblocked polydimethylsiloxanes), halogenated siloxanes, and hydroxyl-functional organosiloxanes distinguished from the organosiloxane. These byproducts and siloxane compounds are generally inert. The reaction product is generally a fluid mixture, but may be heterogeneous or in the form of an emulsion. Generally, there is phase separation between an aqueous phase and a non-aqueous phase, with the organosiloxane and other siloxane byproducts being present in the non-aqueous phase.

The reaction product typically includes the organosiloxane in an amount of from greater than 0 to 80, alternatively from greater than 0 to 70, alternatively from greater than 0 to 60, alternatively from greater than 0 to 50, alternatively from greater than 0 to 40, weight percent based on the total weight of all siloxane compounds present in the reaction product. For example, the organosiloxane may be present in the reaction product in an amount of greater than 0, alternatively at least 0.1, alternatively at least 1, alternatively at least 5, alternatively at least 10, alternatively at least 15, alternatively at least 20, weight percent based on the total weight of all siloxane compounds present in the reaction product. Siloxane compounds are those which include at least one siloxane bond (Si—O—Si). As such, this basis excludes the aqueous acid and other components from the conversion to the organosiloxane.

The organosiloxane has the general formula $R_3SiO(R_2SiO)_nH$, where R is independently selected and defined above and n is an integer from 1 to 200. The organosiloxane may be referred to as an organopolysiloxane when n is such that the organosiloxane is polymeric. Alternatively, the organosiloxane may be oligomeric or monomeric.

The organosiloxane has a terminal silicon-bonded hydroxyl group. The organosiloxane has a kinematic viscosity of from 1 to 500 cSt at 25° C. depending on a selection of subscript n. As readily understood in the art, kinematic viscosity of a fluid may be measured in accordance with ASTM D-445 (2011), entitled "Standard Test Method for Kinematic Viscosity of Transparent and Opaque Liquids (and Calculation of Dynamic Viscosity)."

In certain embodiments, the method comprises isolating the non-aqueous phase from the reaction product. For example, the phases of the reaction product may be separated via any suitable technique, e.g. decanting, centrifuging, distilling, or otherwise isolating the non-aqueous phase from the aqueous phase of the reaction product. As introduced above, the siloxane compounds, including the organosiloxane, are present in the non-aqueous phase. The non-aqueous phase may be referred to as the bulk fluid.

The bulk fluid may be utilized in various end use applications, e.g. as a silicone fluid, grease, solvent, vehicle, etc. Alternatively, the bulk fluid, which comprises the organosiloxane, may be combined with or incorporated into another composition, or the bulk fluid may be utilized for a further reaction (based at least on the organosiloxane).

However, in certain embodiments, the method further comprises isolating the organosiloxane from the reaction product. The organosiloxane may be isolated from the reaction product, from the bulk fluid, etc. For example, the bulk fluid may be first separated from the aqueous phase, and the organosiloxane may be isolated from the bulk fluid. Alternatively, the organosiloxane may be isolated from the reaction product without separation of the bulk fluid from the aqueous phase.

As with the separation of the bulk fluid and the aqueous phase, the organosiloxane may be isolated via any suitable technique. In certain embodiments, isolating the organosiloxane comprises distilling the reaction product and/or the bulk fluid to separate the organosiloxane therefrom.

In particular, the organosiloxane prepared via the inventive method is particularly suitable for use in condensation reactions of siloxanes. Because the organosiloxane includes a single silicon-bonded hydroxyl group, which is terminal, the organosiloxane may be utilized as an enblocker or terminal unit in reactions of siloxanes, e.g. to prepare organopolysiloxanes. This allows selective control over molecular weight and viscosity of such organopolysiloxanes.

For example, the first and second silane compounds in the mixture may be selected in a molar ratio such that the organosiloxane prepared via the inventive method corresponds to an n value of 4, i.e., such that the organosiloxane has the formula $R_3SiO(R_2SiO)_4H$. One of skill in the art can determine desired molecular weight and viscosity of a target organopolysiloxane and utilize the organosiloxane during polymerization of the target organopolysiloxane to cap and obtain the target organopolysiloxane.

As introduced above, the byproducts and siloxane compounds produced along with the organosiloxane via the inventive method are commonly inert. As such, these byproducts and siloxane compounds generally do not contribute to any further condensation reaction. However, further reacting the organosiloxane, while present in the bulk fluid or reaction product, may necessitate isolation of the target organopolysiloxane from the bulk fluid or reaction product, as it is generally undesirable for these byproducts and siloxane compounds to be present along with the target organopolysiloxane.

However, isolation of the organosiloxane from the bulk fluid and/or the reaction product obviates these concerns. As such, when the organosiloxane is isolated form the bulk fluid and/or the reaction product, the organosiloxane may be utilized as a component in a composition, e.g. a reactive composition, or may be utilized as an endblocker or terminal unit in a condensation reaction, e.g. to prepare an organopolysiloxane, such as the target organopolysiloxane referenced above.

Conditions associated with distillation of the bulk fluid or reaction product to isolate the organosiloxane therefrom may vary based on the organosiloxane prepared via the inventive method. For example, when subscript n has a value of 3, the corresponding organosiloxane has a greater volatility and lesser molecular weight than an organosiloxane corresponding to a subscript n value of 150.

As specific examples, when n is 1 and each R is methyl, the organosiloxane has the formula $Me_3SiOSiMe_2OH$ and a boiling point temperature of about 124.3° C. at atmospheric pressure. This boiling point temperature for this particular organosiloxane is between that of hexamethyldisiloxane ($Me_3SiOSiMe_3$) and $D_3$ ($Me_2SiO_{2/2}$)$_3$, which have boiling point temperatures of about 100.5° C. and 135.1° C. at atmospheric pressure, respectively. When n is 2 and when each R is methyl, the organosiloxane has the formula $Me_3Si(OSiMe_2)OSiMe_2OH$ and a boiling point temperature of about 173.8° C. at atmospheric pressure. This boiling point temperature for this particular organosiloxane is between that of $Me_3Si(OSiMe_2)OSiMe_3$ and $D_4$ ($Me_2SiO_{2/2}$)$_4$, which have boiling point temperatures of about 152.5° C. and 175° C. at atmospheric pressure, respectively. When n is 3 and when each R is methyl, the organosiloxane has the formula $Me_3Si(OSiMe_2)_3OSiMe_2OH$ and a boiling point temperature of about 212.0° C. at atmospheric pressure. This boiling point temperature for this particular organosiloxane is between that of $D_5$ ($Me_2SiO_{2/2}$)$_5$ and $Me_3Si(OSiMe_2)_3OSiMe_3$ and, which have boiling point temperatures of about 211.0° C. and 230.0° C. at atmospheric pressure, respectively.

After isolating the organosiloxane from the reaction product and/or the bulk fluid, an organosiloxane composition is obtained. The organosiloxane composition comprises the organosiloxane in an amount of at least 50, alternatively at least 60, alternatively at least 70, alternatively at least 80, alternatively at least 85, alternatively at least 90, alternatively at least 95, alternatively at least 96, alternatively at least 97, alternatively at least 98, alternatively at least 99, alternatively at least 99.9, wt. % based on the total weight of the organosiloxane composition.

As introduced above, the organosiloxane is particularly well suited for use in further condensation-reactions involving organopolysiloxanes. When utilizing the organosiloxane composition comprising the organosiloxane for that purpose, the presence of unwanted byproducts and inert compounds is minimized, which is advantageous and reduces additional purification steps associated with the preparation of organopolysiloxanes. Moreover, use of the organosiloxane prepared via the inventive method minimizes or obviates unwanted byproducts formed in conventional endcapping processes, as the only byproduct from such use of the organosiloxane is water.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

Organosiloxanes are prepared in accordance with the inventive method.

Example 1

A mixture comprising first and second silane compounds is disposed in a reaction vessel. The first silane compound has the general formula $(CH_3)_2SiCl_2$ and the second silane compound has the general formula $(CH_3)_3SiCl$. 114.55 g of the first silane compound (corresponding to 0.89 mol or 107.06 mL) and 65.03 g of the second silane compound (corresponding to 0.60 mol or 75.62 mL) is utilized to give a molar ratio of the first silane compound:the second silane compound of 1.48. Water is disposed in the reaction vessel at a wt/wt phase ratio of 2.86:1 of the aqueous phase to the mixture, which corresponded to 514.36 g of water. The water hydrolyzes the first and second silane compounds of the mixture to form an aqueous acid, HCl, in the vessel at a concentration of 15 wt. %. The aqueous phase/acid cohydroyzes the silane compounds of the mixture to prepare an organosiloxane. The initial temperature of the reaction vessel is 20.5° C., and the setpoint temperature is 55° C. via a heating jacket.

Samples from the reaction vessel are taken at intervals of 5, 30, 75 and 120 minutes after disposing the components in the reaction vessel. Table 1 below includes the relative (aggregate) amounts of each component present in the reaction vessel at these intervals. The values in Table 1 are wt. % based on the total weight of the Si-content in the reaction vessel (i.e., excluding the aqueous acid) and measured via gas chromotography.

TABLE 1

| Component | Time | | | |
|---|---|---|---|---|
| | 5 min | 30 min | 75 min | 120 min |
| Cl-endblocked | 0.1 | 0.04 | 0.02 | 0.02 |
| Cyclics | 12.05 | 12.6 | 12.04 | 11.33 |
| OH-enblocked | 0.62 | 0.2 | 0.05 | 0.04 |

TABLE 1-continued

| Component | Time | | | |
|---|---|---|---|---|
| | 5 min | 30 min | 75 min | 120 min |
| Partial Cl-endblocked | 0.01 | 0.01 | 0.02 | 0.02 |
| Organosiloxane | 20.35 | 16.83 | 1.33 | 8.33 |
| PDMS | 67.18 | 70.63 | 76.88 | 80.19 |

The Cl-endblocked component is an organosiloxane having Cl-endblocking (i.e. a silicon-bonded chorine atom) at each terminal.

Cyclis are cyclic organopolysiloxanes which correspond to $D_3$, $D_4$, $D_5$, $D_6$, $D_7$, $D_8$ and $D_9$.

The OH-endblocked component is an organosiloxane having OH-endblocking (i.e. a silicon-bonded hydroxyl group) at each terminal.

The partial Cl-endblocked component is an organosiloxane having Cl-endblocking (i.e. a silicon-bonded chorine atom) at only one terminal, with the other terminal being trimethylsiloxy-endblocked.

The organosiloxane has the general formula $(CH_3)_3SiO((CH_3)_2SiO)_nH$; wherein n is an integer from 1 to 200.

PDMS is polydimethylsiloxane (trimethylsiloxy-endblocked).

As made clear in Table 1 above, the organosiloxane of interest constituted greater than 20 wt. % after only 5 minutes, which is desirable. The content of the organosiloxane decreases over time, ostensibly as the organosiloxanes condense with one another to form trimethylsiloxy-endblocked polydimethylsiloxane. Further, components with Cl-endblocking are minimized throughout the method, which is also desirable. The contents of the reaction vessel, which is a reaction product comprising the organosiloxane, may be distilled to isolate the organosiloxane from the other components.

Example 2

The mixture from Example 1 is utilized again in Example 2, with the same mass and molar ratio of the first and second silane compounds. The aqueous acid of Example 2 comprises 35.357 wt. % HCl which is utilized in an amount to give a wt/wt phase ratio of 3.76:1 of the aqueous acid to the mixture, which corresponded to 515.42 g of water in the aqueous acid (not counting the mass of the HCl). The aqueous acid is utilized to cohydrolyze the silane compounds of the mixture and to prepare an organosiloxane. The initial temperature of the reaction vessel is 20° C., and the setpoint temperature is 60° C. via a heating jacket.

Samples from the reaction vessel are taken at intervals of 5, 35, 85 and 120 minutes after disposing the components in the reaction vessel. Table 2 below includes the relative (aggregate) amounts of each component present in the reaction vessel at these intervals. The values in Table 2 are wt. % based on the total weight of the Si-content in the reaction vessel (i.e., excluding the aqueous acid).

TABLE 2

| Component | Time | | | |
|---|---|---|---|---|
| | 5 min | 35 min | 85 min | 120 min |
| Cl-endblocked | 0.05 | 0.03 | 0.026 | 0.029 |
| Cyclics | 12.841 | 11.204 | 9.373 | 9.185 |
| OH-enblocked | 0.012 | 0.007 | 0.003 | 0.003 |
| Partial Cl-endblocked | 5.897 | 3.059 | 2.207 | 2.226 |

TABLE 2-continued

| | Time | | | |
|---|---|---|---|---|
| Component | 5 min | 35 min | 85 min | 120 min |
| Organosiloxane | 0.169 | 0.131 | 0.142 | 0.197 |
| PDMS | 77.22 | 82.845 | 86.266 | 86.861 |
| Second Silane Compound | 3.691 | 3.167 | 1.942 | 1.494 |

As made clear in Table 2 above, the increased concentration of the aqueous acid resulted in a greater production of partial Cl-endblocked organosiloxanes $((CH_3)_3SiO((CH_3)_2SiO)_{n-1}Si(CH_3)_2Cl$, where n is 1 to 200), which may be hydrolyzed with water to give the organosiloxane compound of interest. However, the initial yield of the organosiloxane is less than that achieved in Example 1, where the HCl of the aqueous acid is formed in situ. As shown in Example 4, the partial Cl-endblocked organosiloxanes, which are formed with higher aqueous acid concentrations, may be washed with water to give the organosiloxane (i.e., by hydrolyzing the partial Cl-endblock to give a silanol group).

Example 3

The mixture from Example 1 is utilized again in Example 3, with the same mass and molar ratio of the first and second silane compounds. The aqueous acid of Example 3 comprises 35.357 wt. % HCl which is utilized in an amount to give a wt/wt phase ratio of 3.89:1 of the aqueous acid to the mixture, which corresponded to 512.23 g of water in the aqueous acid (not counting the mass of the HCl). The aqueous acid is utilized to cohydrolyze the silane compounds of the mixture and to prepare an organosiloxane. The initial temperature of the reaction vessel is 20° C., and the setpoint temperature is 60° C. via a heating jacket.

Samples from the reaction vessel are taken at intervals of 1, 3, 5 and 10 minutes after disposing the components in the reaction vessel. Table 3 below includes the relative (aggregate) amounts of each component present in the reaction vessel at these intervals. The values in Table 3 are wt. % based on the total weight of the Si-content in the reaction vessel (i.e., excluding the aqueous acid).

TABLE 3

| | Time | | | |
|---|---|---|---|---|
| Component | 1 min | 3 min | 5 min | 10 min |
| Cl-endblocked | 0.409 | 0.186 | 0.095 | 0.026 |
| Cyclics | 13.075 | 12.468 | 12.554 | 12.055 |
| OH-endblocked | 0.102 | 0.036 | 0.018 | 0.008 |
| Partial Cl-endblocked | 15.796 | 11.515 | 8.797 | 3.863 |
| Organosiloxane | 0.116 | 0.156 | 0.113 | 0.084 |
| PDMS | 66.01 | 72.186 | 75.15 | 80.75 |
| Second Silane Compound | 4.442 | 3.428 | 3.262 | 3.206 |

As made clear in Table 3 above, as compared with Example 2, a much greater yield of the partial Cl-endblocked organosiloxanes $((CH_3)_3SiO((CH_3)_2SiO)_{n-1}Si(CH_3)_2Cl$, where n is 1 to 200), which may be hydrolyzed with water to give the organosiloxane compound of interest. However, the initial yield of the organosiloxane is less than that achieved in Example 1, where the HCl of the aqueous acid is formed in situ. In fact, in Example 3, a significant yield of the partial Cl-endblocked organosiloxanes was obtained after merely 1 minute. As shown in Example 4, the partial Cl-endblocked organosiloxanes, which are formed with higher aqueous acid concentrations, may be washed with water to give the organosiloxane (i.e., by hydrolyzing the partial Cl-endblock to give a silanol group).

Example 4

The mixture from Example 1 is utilized again in Example 4, with the same mass and molar ratio of the first and second silane compounds. The aqueous acid of Example 4 comprises 35.86 wt. % HCl which is utilized in an amount to give a wt/wt phase ratio of 3.85:1 of the aqueous acid to the mixture, which corresponded to 519.04 g of water in the aqueous acid (not counting the mass of the HCl). The aqueous acid is utilized to cohydrolyze the silane compounds of the mixture and to prepare an organosiloxane. The initial temperature of the reaction vessel is 20° C., and the setpoint temperature is 60° C. via a heating jacket.

Samples from the reaction vessel are taken 1 minute after disposing the components in the reaction vessel. Table 4 below includes the relative (aggregate) amounts of each component present in the reaction vessel at this interval. The values below in Table 4 are wt. % based on the total weight of the Si-content in the reaction vessel (i.e., excluding the aqueous acid).

Further, because Example 4 also resulted in the preparation of at least some partial Cl-endblocked organosiloxanes, some of the samples are combined with water at a 1:5 weight ratio of sample:water to give a hydrolyzed mixture. The hydrolyzed mixture is shaken in a sealed vial to hydrolyze the partial Cl-endblocked organosiloxanes to give the organosiloxane. Table 4 below also includes the relative (aggregate) amounts of each component present in the sealed vial preparing the organosiloxane from the partial Cl-endblocked organosiloxanes under the column header "washed."

TABLE 4

| | Sample Type: | |
|---|---|---|
| Component | Unwashed | Washed |
| Cl-endblocked | 0.294 | 0.028 |
| Cyclics | 14.979 | 16.329 |
| OH-endblocked | 0.036 | 0.082 |
| Partial Cl-endblocked | 12.573 | 0.144 |
| Organosiloxane | 0.442 | 9.915 |
| PDMS | 66.826 | 73.306 |

As made clear in Table 4 above, combining the samples with water (i.e., washing the samples with water) resulted in the relative wt. % of the organosiloxane increasing from 0.442 to 9.915, whereas the wt. % of the partial Cl-endblocked organosiloxanes is reduced to 0.144 from 12.573. As such, a very short residence time can be utilized to prepare partial Cl-endblocked organosiloxanes, which may be combined with water to give the organosiloxane, which may be isolated from the other components.

Example 5

The mixture from Example 1 is utilized again in Example 5, except the first silane compound is utilized in an amount of 121.292 grams (or 0.94 mol) and the second silane compound is utilized in an amount of 31.06 g (or 0.29 mol) for a molar ratio of the first silane compound:second silane compound of 3.24. Water is utilized in an amount to give a wt/wt phase ratio of 5.11:1 of the water to the mixture, which corresponded to 718.92 g of water in the aqueous acid (not counting the mass of the HCl). An aqueous acid, HCl, is formed in situ from the water cohydrolyzing the silane compounds of the mixture at a concentration of 34 wt. %. The aqueous acid is utilized to cohydrolyze the silane compounds of the mixture and to prepare an organosiloxane. The initial temperature of the reaction vessel is 20° C., and the setpoint temperature is 55° C. via a heating jacket.

Samples from the reaction vessel are taken at intervals of 1, 2, 3, 4 and 5 minutes after disposing the components in the reaction vessel. Table 5 below includes the relative (aggregate) amounts of each component present in the reaction vessel at these intervals. The values in Table 5 are wt. % based on the total weight of the Si-content in the reaction vessel (i.e., excluding the aqueous acid).

TABLE 5

| Component | Time | | | | |
|---|---|---|---|---|---|
| | 1 min | 2 min | 3 min | 4 min | 5 min |
| Cl-endblocked | 0 | 0 | 0 | 0 | 0 |
| Cyclics | 21.484 | 21.89 | 21.668 | 21.757 | 21.775 |
| OH-enblocked | 0.455 | 1.588 | 1.599 | 1.184 | 1.465 |
| Partial Cl-endblocked | 0.016 | 0.037 | 0.037 | 0.042 | 0.03 |
| Organosiloxane | 18.621 | 24.049 | 23.594 | 22.86 | 23.321 |
| PDMS | 55.553 | 46.783 | 45.941 | 47.753 | 46.785 |

As made clear in Table 5 above, the organosiloxane was prepared with excellent yield after only 1 minute in the reaction vessel, with yield being maximized in this Example after merely 2 minutes, which is desirable. The organosiloxane may advantageously be prepared quickly, thus reducing energy costs associated with its production, and may optionally be isolated from other components in the reaction product.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A method of preparing an organosiloxane, said method comprising:
cohydrolyzing a mixture comprising a first silane compound having the general formula $R_2SiX_2$ and a second silane compound having the general formula $R_3SiR^1$ in the presence of an aqueous acid; wherein each R is independently selected from H and a hydrocarbyl group, each X is an independently selected halogen atom, and $R^1$ is X or $OSiR_3$, thereby preparing the organosiloxane in a reaction product; and
optionally, isolating the organosiloxane from the reaction product;
wherein the organosiloxane has the general formula $R_3SiO(R_2SiO)_nH$; wherein n is an integer from 1 to 200; and
wherein the method is carried out over a period of time of from greater than 0 to no greater than 10 minutes.

2. The method of claim 1 comprising isolating the organosiloxane from the reaction product.

3. The method of claim 2 wherein isolating the organosiloxane comprises distilling the reaction product to separate the organosiloxane therefrom.

4. The method of claim 1 wherein the aqueous acid comprises hydrochloric acid at a concentration of at least 20 wt % based on the total weight of the aqueous acid.

5. The method of claim 4 wherein cohydrolyzing prepares a halogenated organosiloxane and wherein the method further comprises combining the halogenated organosiloxane with water to prepare the organosiloxane from the halogenated organosiloxane.

6. The method of claim 1 wherein the aqueous acid comprises hydrochloric acid at a concentration of less than 20 wt % based on the total weight of the aqueous acid.

7. The method of claim 1 wherein water is combined with the mixture and wherein the aqueous acid is generated in situ from the water and the mixture.

8. The method of claim 1 wherein each R is a $C_1$-$C_4$ alkyl group and each X is Cl.

9. The method of claim 1 wherein the organosiloxane has a kinematic viscosity of from 1 to 500 cSt at 25° C.

10. The method of claim 1 wherein the aqueous acid is saturated hydrochloric acid and wherein cohydrolyzing liberates anhydrous hydrochloric acid gas.

11. The method of claim 1 wherein the reaction product comprises the organosiloxane in a concentration of from greater than 0 to 40 weight percent based on the total weight of all siloxane compounds present in the reaction product.

12. The method of claim 1 wherein a phase ratio of the aqueous acid utilized to the total amount of the first and second silane compounds utilized is at least 1:1.

13. The method of claim 1 carried out at a temperature of from greater than 0° C. to a boiling point temperature of the aqueous acid.

14. The method of claim 1 wherein the first and second silane compounds are utilized in a molar ratio of ≥1:1 of the first silane compound to the second silane compound.

15. A method of preparing an organosiloxane, said method comprising:
cohydrolyzing a mixture comprising a first silane compound having the general formula $R_2SiX_2$ and a second silane compound having the general formula $R_3SiR^1$ in the presence of an aqueous acid; wherein each R is independently selected from H and a hydrocarbyl group, each X is an independently selected halogen atom, and $R^1$ is X or $OSiR_3$, thereby preparing the organosiloxane in a reaction product; and
optionally, isolating the organosiloxane from the reaction product;
wherein the organosiloxane has the general formula $R_3SiO(R_2SiO)_nH$; wherein n is an integer from 1 to 200; and
wherein the aqueous acid comprises hydrochloric acid at a concentration of at least 20 wt % based on the total weight of the aqueous acid.

16. The method of claim 15 wherein water is combined with the mixture and wherein the aqueous acid is generated in situ from the water and the mixture.

17. The method of claim 15 wherein the organosiloxane has a kinematic viscosity of from 1 to 500 cSt at 25° C.

18. The method of claim 15 wherein cohydrolyzing prepares a halogenated organosiloxane and wherein the method further comprises combining the halogenated organosiloxane with water to prepare the organosiloxane from the halogenated organosiloxane.

19. The method of claim 15 wherein the aqueous acid is saturated hydrochloric acid and wherein cohydrolyzing liberates anhydrous hydrochloric acid gas.

20. The method of claim 15 wherein a phase ratio of the aqueous acid utilized to the total amount of the first and second silane compounds utilized is at least 1:1.

* * * * *